Figure 5:
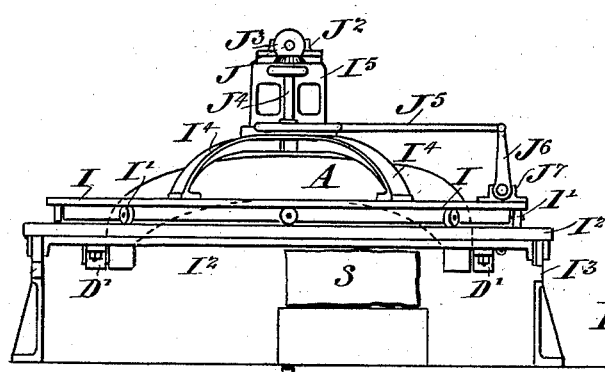

(No Model.) 4 Sheets—Sheet 1.
W. ERRINGTON.
AUTOMATIC STONE CUTTING AND STONE DRESSING MACHINERY.
No. 505,624. Patented Sept. 26, 1893.
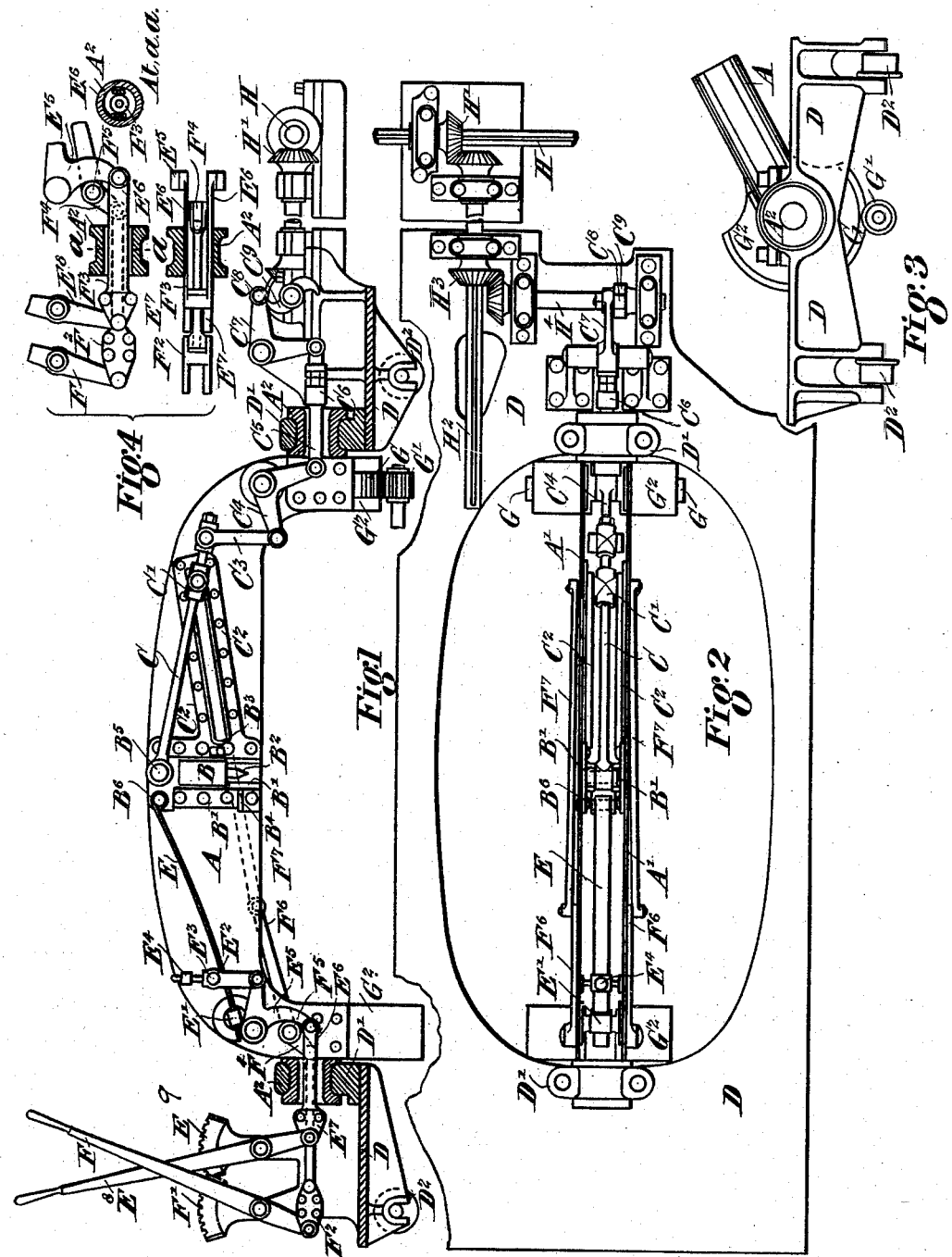

(No Model.) 4 Sheets—Sheet 2.

W. ERRINGTON.
AUTOMATIC STONE CUTTING AND STONE DRESSING MACHINERY.

No. 505,624. Patented Sept. 26, 1893.

Witnesses
T. A. Conner Jr
E. R. Conner

Inventor
William Errington
By Geo. H. Whinery
atty.

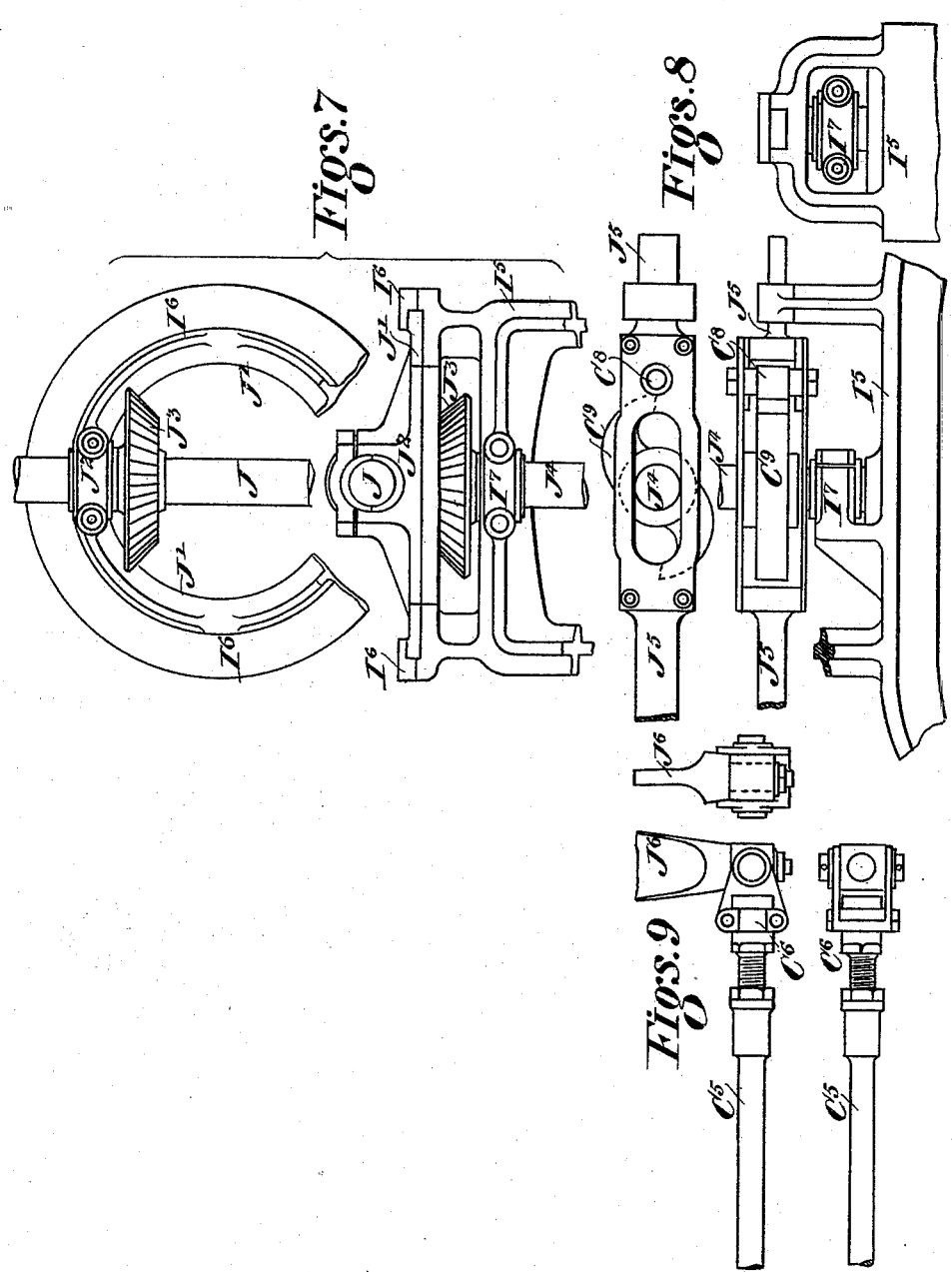

(No Model.) 4 Sheets—Sheet 4.
W. ERRINGTON.
AUTOMATIC STONE CUTTING AND STONE DRESSING MACHINERY.
No. 505,624. Patented Sept. 26, 1893.
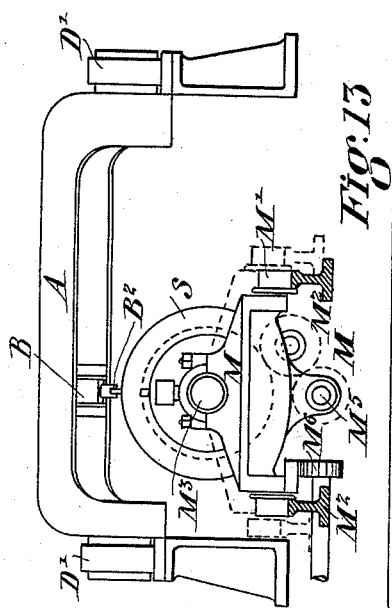
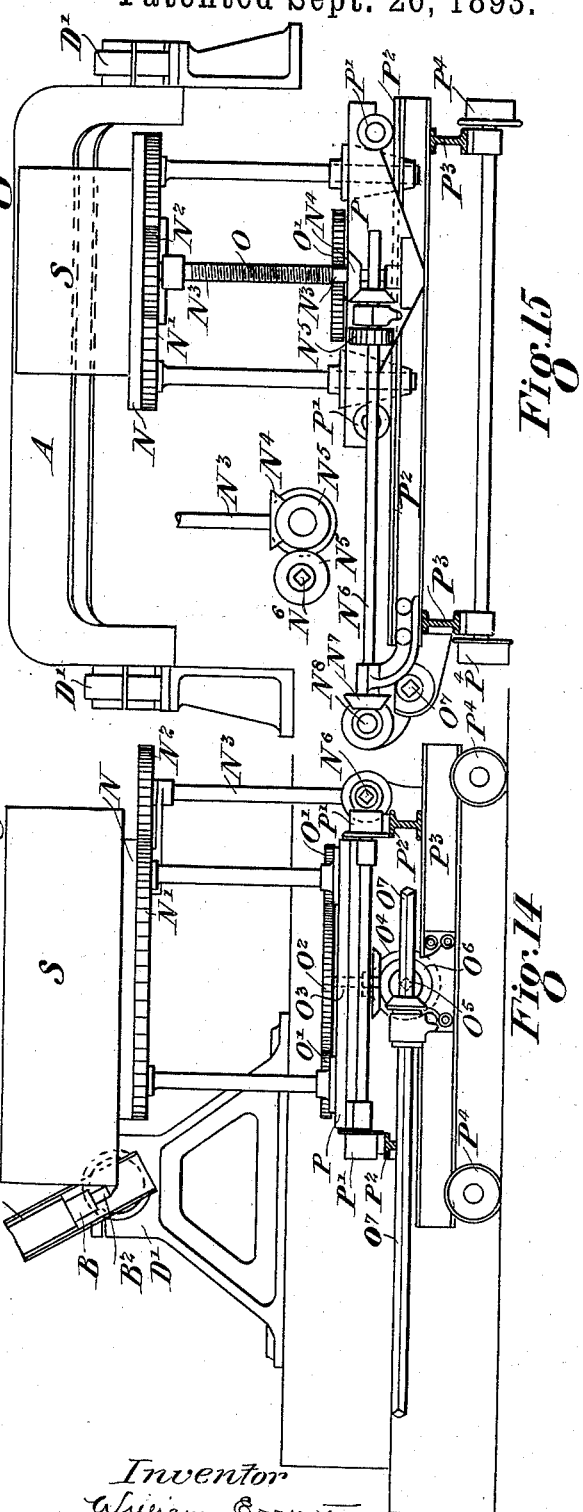
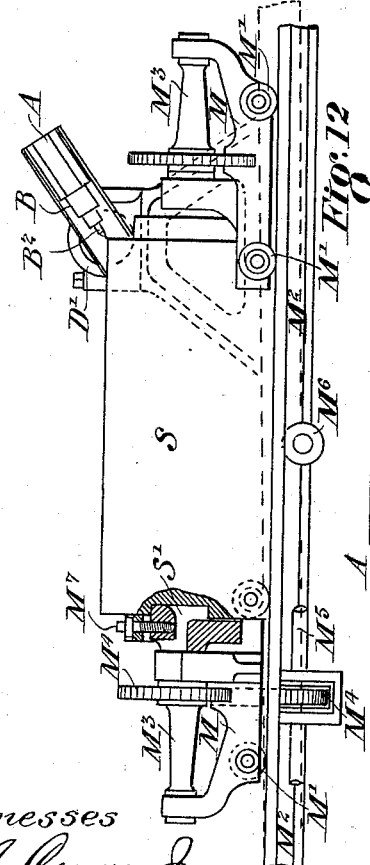

UNITED STATES PATENT OFFICE.

WILLIAM ERRINGTON, OF MELBOURNE, VICTORIA.

AUTOMATIC STONE-CUTTING AND STONE-DRESSING MACHINERY.

SPECIFICATION forming part of Letters Patent No. 505,624, dated September 26, 1893.

Application filed March 2, 1892. Serial No. 423,550. (No model.)

*To all whom it may concern:*

Be it known that I, WILLIAM ERRINGTON, engineer, a subject of Her Majesty the Queen of the United Kingdom of Great Britain and Ireland, and a resident of the Salisbury Buildings, Melbourne, in the British Colony of Victoria, have invented a new and useful Improvement in Automatic Stone-Cutting and Stone-Dressing Machinery, of which the following is a specification.

The machinery comprised in my invention has been designed to cut and dress stone by mechanical means with tools such as picks, &c., arranged to strike the stone in a manner similar to their use in the hands of a stone mason.

The essential parts of my invention are assembled upon what I call a trunnioned cross head or bridge which carries at its center, transversely to its axis a sliding tool block or tup, in which the pick or tool is secured. This tool block is acted on by a steel spring bar the resilient force of which carries the block toward the axial line of the trunnion and so causing the tool to strike the stone with the necessary blow or percussion to chip or dress it. Again the tup or tool block is lifted by a lever acted on by a cam through the medium of suitable connections so that when the cam and its connections have completed the lift of tool block the spring brings it and so the tool again onto its work. I provide means for adjusting the pressure on the spring bar, also for adjusting the fulcrum of the lifting bar the latter adjustment regulating the stroke of block, both such operations being performed by levers arranged outside one of the trunnions of cross head the necessary connections passing through center of trunnion. Again through trunnion at other end the connection passes out from cross head to the cam gear.

A noticeable feature of my invention is that no matter what stroke I give to the tool it always terminates at the axial line of trunnion and further by reason of the tool being carried in a trunnioned cross head I can arrange it to strike the stone at any desired angle.

Now having explained that the cross head supported on trunnions and carrying a sliding tool block and its operating gear form the essential parts of my invention I wish it to be understood that such trunnioned cross head can be supported in horizontal bearings upon a frame or carriage to have a longitudinal and transverse traverse or it can be arranged to have a circular and longitudinal traverse or it may be arranged in vertical bearings adjacent to a carriage having a longitudinal traverse and provided with a rising and lowering table or the stone being dressed may be arranged on a rotary table aside of the cross head and tool or the stone may be supported under the cross head between centers so that it can be cut to a cylindrical or other cylindric form.

In my drawings I show the application of my invention to machines as just stated and will hereinafter describe each separately and throughout using similar letters of reference to indicate corresponding parts.

Figure 10:
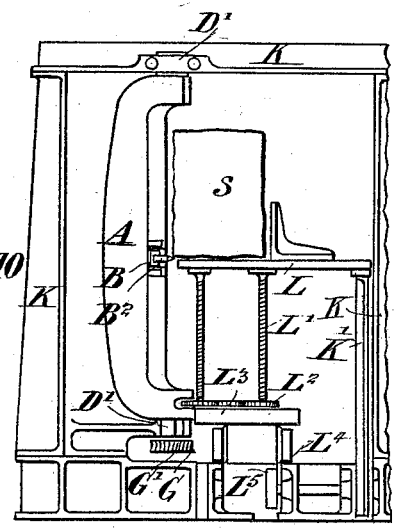
Figure 6:
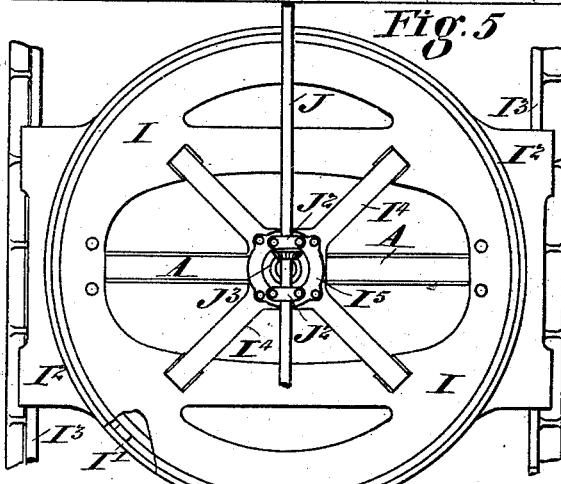
Figure 11:
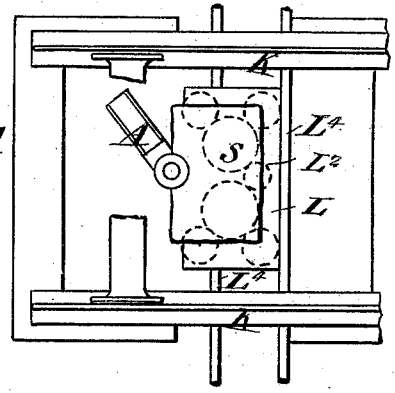

Figures 1, 2, and 3 show side section, plan and end view respectively of the cross head supported horizontally on a bed or carriage having a longitudinal traverse and Fig. 4 details of the gear passing through trunnions for governing the spring bar and variable fulcrum of lifting bar. Figs. 5 and 6 show a horizontal crosshead carried on a revolving table. Fig. 7 gives a plan and side view of the turret. Fig. 8 shows plan, side and end views of the cam gear. Fig. 9 shows one end of the connecting rod. Figs. 10 and 11 are side and plan views of a vertical crosshead and a vertically movable work table. Figs. 12 and 13 show a machine for cutting round columns. Figs. 14 and 15 show a machine with a revoluble work table.

A is the cross head or bridge formed of two steel cheek plates A' bolted or riveted to the jaws or flanges of the trunnions $A^2$.

B is the tup or sliding tool block working in guides B' and having a slot or hole in it to receive the tool $B^2$ that is pinched by screw $B^3$.

$B^4$ is a buffer or elastic pad to determine the limit of down stroke of tool block.

C is the lifting bar supported in a motion block C' carried in guides $C^2$ provided in the cheeks of cross head the inner end of lifting bar being centered on a pin $B^5$ at top of tool block while its outer end is connected by link $C^3$ to a bell crank $C^4$ centered between cheeks of cross head the lower arm of such crank being connected to a rod $C^5$ furnished with a swivel $C^6$ passing out through center of trunnion and connected to another bell crank $C^7$ whose upper arm has a pin $C^8$ on it for being operated on by a cam $C^9$, such latter bell crank and the cam being suitably supported upon the carriage or bed D that supports the trunnion bearings $D'$. At other side of cross head and between its cheeks is the spring bar E whose resilient force acting upon the tup or sliding block B gives the strike or percussion to the tool. Spring E is connected to a pin $B^6$ at top of sliding tool block B, its other end passing through a slot in sway pin $E'$. To give said spring its requisite resilient force its top side is acted on by a steel press roller $E^2$ carried in a loop link $E^3$ whose top passes through guide $E^4$ while its lower end is attached to arm of a bell crank $E^5$ also centered between cheeks of cross head A the lower arms of bell crank $E^5$ being connected by links $E^6$ to a swivel $E^7$ attached to hand lever $E^8$ arranged aside of a slotted quadrant $E^9$ at any grade upon which the hand lever may be secured to adjust the pressure upon spring bar E.

F is the lever for varying fulcrum of lifting bar C and it is arranged aside of a quadrant $F'$ the lower end of lever being attached to a swivel $F^2$ upon end of a connecting rod $F^3$ that passes through the other connections in the trunnion and is connected to a lever $F^4$ centered upon a pin $F^5$ at outer ends of which pin are side levers $F^6$ connected to rods $F^7$ that are attached to pin of motion block $C'$ of lifting arm C so that by securing the lever F at the desired position on its quadrant the fulcrum of the lifting arm C is regulated. All rods passing through the trunnions are furnished with swivels to allow cross head to be canted to any angle and still receive the motions hereinbefore described. To accomplish such canting of the cross head a toothed wheel G or a tangent wheel is secured on one trunnion jaw of cross head and designed to be operated by a pinion $G'$ or a worm wheel. I also provide balance weights $G^2$ on the jaws of cross head to counterpoise the weight of its cheeks and gears. The bed or carriage D is mounted on wheels $D^2$ traveling on suitable rails.

H is the driving shaft imparting motion by miter gears $H'$ to traverse shaft $H^2$ which in turn imparts motion by miter gears $H^3$ to the cam shaft $H^4$.

In the figures the bed or carriage D is shown designed for traversing in a direction in a line with the cross head A but it is well understood that the bed D can be arranged on an under carriage having wheels for traveling in a direction transverse to it when the shaft H would be arranged to allow for the traverse of carriage D.

Figs. 5 and 6 show the cross head A again horizontal the bearings $D'$ for its trunnion being supported from a turn table or circular frame I, carried by wheels or runners $I'$ upon an under bed or carriage $I^2$ whose wheels travel on the longitudinal rails $I^3$. This machine has both a circular and a longitudinal traverse.

To better explain the means for imparting motion to the striking gear from overhead shaft J carried upon turret of turn table I show in Fig. 7 plan and side view of the bearings for such shaft and top of turret and in Fig. 8 plan, side and end views of the cam gear. Secured upon turntable I, is an arched cross bracket $I^4$ supporting on its crown a turret bracket $I^5$ the upper flange of which forms a bed for the flange base $J'$ of bearings $J^2$. $I^6$ is a flange or ring bolted to turret $I^5$ and securing flange $J'$ in position and at same time allowing turret and turntable to rotate under the bearings. $J^3$ are miter gears conveying motion from shaft J to vertical spindle $J^4$ supported in bearings $I^7$ of turret, such latter spindle having the cam $C^9$ keyed on it that operates on a pin $C^8$ secured between the cheeks of a sliding bar $J^5$ supported as shown and having its outer end attached to lever $J^6$ centered upon bearings $J^7$ carried on turntable I, while the lower end of lever is connected as shown in Fig. 9 to the swivel block $C^6$ of rod $C^5$ that passes through trunnion $A^4$ and is connected to bell crank $C^4$ (Fig. 1). Rod $C^5$ is also furnished with a box adjusting nut.

Figs. 10 and 11 show side view and plan of a machine having the cross head A supported in vertical bearings $D'$ carried upon a framing K, the lower trunnion being fitted with worm and tangent gear G—$G'$ to work the cross head radially. In this machine the stone S is seated on a rising and lowering table L seated on four screwed pillars $L'$ operated by the gears $L^2$ as shown. Said gears are in turn supported on carriage $L^3$ running on rails $L^4$ and propelled by the rack and pinion gear $L^5$. From the foregoing description it will be understood that the carriage with its stone can traverse longitudinally against the tool $B^2$ while the table can be lifted or lowered. $K'$ is one of a number of movable stays of various lengths for supporting table L.

Figs. 12 and 13 show side and end views of the cross head A again arranged horizontal and above a stone S supported between traverse head stocks M carried by wheels $M'$ upon rails $M^2$ and designed to allow of my invention cutting or dressing a stone to a cylindrical form such as for a column. Motion is imparted to the spindles $M^3$ of headstocks by the gearing $M^4$ from shaft $M^5$ while the traverse motion is imparted by rack and pinion gear $M^6$. To support a stone between the headstocks I prefer to cut a recess $S'$ at its ends and have screw grabs $M^7$ fitted on chucks or face plates of head stocks to grip the stone firmly within its end recesses. If it is desired to dress the stone to a tapering cylindric form I arrange a pair of suitably inclined rails outside the horizontal ones (as shown by dotted lines) and allow one head stock having a central pair of wheels to run on them while the other runs on the horizontal rails.

Figs. 14 and 15 show end and side views of a horizontal cross head A arranged to operate on a block of stone S carried on a turntable N that is capable of being raised and lowered such turntable being supported on a carriage that has a longitudinal and transverse traverse. By this machine a block of stone may be cubed or it may be dressed to a uniform thickness and have its side surface cut to a circular form. The rotary motion to turntable is produced by the table having teeth $N'$ on its periphery gearing with pinion $N^2$ upon vertical spindle $N^3$ driven by miter gears $N^4$ receiving motion through the intervention of spur pinions $N^5$ from shaft $N^6$ driven by miters $N^7$ one of which is upon shaft $N^8$ and to which latter rotary motion is imparted in any well known manner. The turntable N is supported on screwed pillars O fitting in the tapped bosses or nuts of the spur pinions $O'$, that gear with spur wheel $O^2$ upon vertical spindle $O^3$ driven by bevel gear that derives motion from a horizontal spindle $O^5$ driven by bevel gear $O^6$ and receiving motion from shaft $O^7$ to which rotary motion is also imparted as desired. The turntable is mounted on carriage P whose wheels $P'$ travel on rails $P^2$ upon under carriage $P^3$ mounted on wheels $P^4$. Any suitable and well known gears are provided to impart motion to the aforesaid several movements of the carriages and turntable.

As an alternative the cross head may be a fixture at any determined angle upon hollow end supports and furnished with sliding tool block and operating mechanism although I prefer that it be supported on trunnions as hereinbefore described. Also in place of having the tool carried by a sliding block it may be carried and have motion imparted to it by a small cylinder worked either by compressed air or by steam and arranged upon the cross head at the position occupied by the sliding tool block.

Having now particularly described and ascertained the nature of my said invention and in what manner the same is to be performed, I declare that what I claim is—

1. In a machine for cutting and dressing stone, a crosshead mounted on hollow trunnions, a tool carrier mounted on the crosshead, mechanism for operating said tool carrier passing through one of the trunnions, and separate mechanism for regulating said tool carrier passing through the other trunnion, substantially as described.

2. In machinery for cutting and dressing stone a cross head supported on trunnions in combination with the sliding tool block, the spring and the variable stroke lifting bar all assembled arranged and operated as herein described.

3. In machinery for cutting and dressing stone a cross head or bridge supported on trunnions or hollow bearers and carrying a sliding tool block B in combination with lifting bar C, motion block $C'$ working in guides, link $C^3$, bell crank $C^4$, connecting rod $C^5$ furnished with swivel $C^6$ bell crank $C^7$ furnished with pin $C^8$ and cam $C^9$ as herein described.

4. In machinery for cutting and dressing stone a cross head or bridge supported on trunnions or hollow bearers and carrying a sliding tool block B lifted by arm C in combination with side levers $F^7$—$F^6$, cross pin $F^5$ lever $F^4$ connecting rod $F^3$ furnished with swivel $F^2$ and hand lever F arranged preferably aside of notched quadrant $F'$ as herein described.

5. In machinery for cutting and dressing stone a cross head or bridge supported on trunnions or hollow bearers and carrying a sliding tool block B acted on by a spring E in combination with pressure roller $E^2$, loop piece $E^3$, bell crank $E^5$, links $E^6$ furnished with swivel $E^7$ and hand lever $E^8$ preferably arranged aside of a notched quadrant $E^9$ as herein described.

6. In machinery for cutting and dressing stone, a cross-head mounted on trunnions and carrying a sliding tool block, a lifting bar pivoted to the tool block, and suitable connections for operating said lifting bar, said connections passing through one of the trunnions, substantially as described.

7. In machinery for cutting and dressing stone, a cross-head mounted on trunnions and carrying a sliding tool block, a lifting bar pivoted to said block, a swiveled connecting rod passing through one of said trunnions and connected with the lifting bar, and means for actuating the connecting rod, substantially as described.

8. In machinery for cutting and dressing stone, a cross-head mounted on trunnions and carrying a sliding tool block, a flat spring connected at one end with said tool block, a movable roller bearing upon said spring, and mechanism for adjusting said roller, said mechanism passing through one of said trunnions, substantially as described.

9. In machinery for cutting and dressing stone, a cross-head mounted on trunnions, and carrying a sliding tool block, a lifting bar pivoted to said block, a movable fulcrum for said bar, means for operating the bar, and means for adjusting the fulcrum, substantially as described.

10. In machinery for cutting and dressing stone, a cross-head mounted on hollow trunnions, and carrying a sliding tool block, a lifting bar pivoted to said block, a movable fulcrum for said bar, means for actuating the lifting bar, and means for adjusting the fulcrum, each comprising a connecting rod passing through a trunnion, substantially as described.

11. In machinery for cutting and dressing stone, a cross head mounted on trunnions, and carrying the tool block, a reciprocating table carrying the crosshead, a power shaft revolving in stationary bearings, and suitable connections between said shaft and the tool block, substantially as described.

12. In machinery for cutting and dressing stone, a cross head mounted on trunnions and carrying a tool block, a revoluble table carrying said crosshead,—a power shaft rotating in stationary bearings, and connections between said power shaft and the tool block, substantially as described.

13. In machinery for cutting and dressing stone, a cross head mounted on trunnions and carrying a tool block, a revoluble table carrying said crosshead, a reciprocating table carrying said revoluble table, a power shaft revolving in stationary bearings, and connections between said shaft and the tool block, substantially as described.

In testimony that I claim the foregoing as my invention I have signed my name, in presence of two witnesses, this 1st day of September, 1891.

WILLIAM ERRINGTON.

Witnesses:
WALTER SULLY,
JAMES HINGSTON.